US012613417B2

(12) United States Patent

Pedder et al.

(10) Patent No.: US 12,613,417 B2

(45) Date of Patent: Apr. 28, 2026

(54) ELECTRONIC DEVICE WITH A TUNABLE LENS HAVING TWO ADJUSTABLE SURFACES

(71) Applicant: Apple Inc., Cupertino, CA (US)

(72) Inventors: James E. Pedder, Oxfordshire (GB);
Igor Stamenov, San Ramon, CA (US);
Richard J. Topliss, Cambridge (GB);
Thomas M. Gregory, Cambridgeshire
(GB); Michael D. Simmonds, Kent
(GB)

( * ) Notice: Subject to any disclaimer, the term of this
patent is extended or adjusted under 35
U.S.C. 154(b) by 300 days.

(21) Appl. No.: 18/481,927

(22) Filed: Oct. 5, 2023

(65) Prior Publication Data

US 2024/0027776 A1 Jan. 25, 2024

Related U.S. Application Data

(63) Continuation of application No.
PCT/US2022/020201, filed on Mar. 14, 2022.

(60) Provisional application No. 63/174,840, filed on Apr.
14, 2021.

(51) Int. Cl.
*G02B 27/01* (2006.01)
*G02B 3/14* (2006.01)

(52) U.S. Cl.
CPC ........... *G02B 27/0172* (2013.01); *G02B 3/14*
(2013.01)

(58) Field of Classification Search
CPC .................................................. G02B 27/0172
See application file for complete search history.

(56) References Cited

U.S. PATENT DOCUMENTS

| | | | |
|---|---|---|---|
| 7,646,544 B2 | 1/2010 | Batchko et al. | |
| 7,672,059 B2 | 3/2010 | Batchko et al. | |
| 8,000,022 B2 | 8/2011 | Niederer | |
| 8,755,124 B2 | 6/2014 | Aschwanden et al. | |
| 2009/0195882 A1 | 8/2009 | Bolle et al. | |
| 2010/0202054 A1 | 8/2010 | Niederer | |
| 2012/0127062 A1* | 5/2012 | Bar-Zeev | .............. G06T 19/006 |
| | | | 345/6 |
| 2014/0285911 A1 | 9/2014 | Aschwanden et al. | |

(Continued)

FOREIGN PATENT DOCUMENTS

| | | |
|---|---|---|
| CN | 103163577 A | 6/2013 |
| DE | 102007004080 A1 | 8/2008 |

(Continued)

*Primary Examiner* — Edmond C Lau
(74) *Attorney, Agent, or Firm* — Treyz Law Group, P.C.;
Joseph F. Guihan; Jinie M. Guihan

(57) ABSTRACT

A lens module may include a first lens element, a lens
shaping structure that is coupled to the first lens element, and
a plurality of actuators that are configured to adjust a
position of the lens shaping structure to adjust the first lens
element. The lens module may also include a second lens
element and a fluid-filled chamber between the first and
second lens elements. To allow dynamic adjustments of the
second lens element without requiring additional actuators,
the second lens element may be a semi-rigid lens element.
When the actuators adjust the curvature of the first lens
element, the gauge pressure applied to the second lens
element is changed. This causes a change in curvature of the
second lens element. The actuators may therefore adjust the
curvature of both the first and second lens elements even
though none of the actuators are attached to the second lens
element.

18 Claims, 10 Drawing Sheets

(56)     References Cited

U.S. PATENT DOCUMENTS

| | | |
|---|---|---|
| 2015/0378067 A1 | 12/2015 | Stevens et al. |
| 2016/0124220 A1 | 5/2016 | Bueeler et al. |
| 2016/0363737 A9 | 12/2016 | Aschwanden et al. |
| 2017/0017019 A1* | 1/2017 | Bolis ........................ G02B 3/14 |
| 2019/0302479 A1 | 10/2019 | Smyth et al. |
| 2020/0089024 A1 | 3/2020 | Stevens et al. |
| 2020/0096770 A1* | 3/2020 | Pedder ............... G02B 27/0172 |
| 2020/0341172 A1 | 10/2020 | Stevens et al. |

FOREIGN PATENT DOCUMENTS

| | | |
|---|---|---|
| JP | 2009175536 A | 8/2009 |
| JP | 2014163963 A | 9/2014 |
| JP | 2016048389 A | 4/2016 |
| JP | 2018063393 A | 4/2018 |
| WO | 2006011937 A2 | 2/2006 |
| WO | 2013096052 A2 | 6/2013 |
| WO | 2020060716 A1 | 3/2020 |

* cited by examiner

ELECTRONIC DEVICE WITH A TUNABLE LENS HAVING TWO ADJUSTABLE SURFACES

This application is a continuation of international patent application No. PCT/US2022/020201, filed Mar. 14, 2022, which claims priority to U.S. provisional patent application No. 63/174,840, filed Apr. 14, 2021, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A head-mounted device may have a display that displays content for a user. Head-mounted support structures in the device support the display on the head of the user.

A lens module in the head-mounted device may include a first transparent lens element, a lens shaping structure that is coupled to the first transparent lens element, and a plurality of actuators that are configured to adjust a position of the lens shaping structure to adjust the first transparent lens element. The lens module may also include a second transparent lens element and a fluid-filled chamber between the first and second transparent lens elements.

To allow dynamic adjustments of the second transparent lens element without requiring additional actuators in the lens module, the second transparent lens element may be a semi-rigid transparent lens element. When the actuators adjust the curvature of the first transparent lens element, the gauge pressure applied to the second transparent lens element is changed. This causes a change in curvature of the second transparent lens element. The actuators may therefore adjust both the curvature of the first transparent lens element and the second transparent lens element, even though none of the actuators are attached to the second transparent lens element.

The second transparent lens element may optionally be coupled to a biasing structure or a flexible seal to ensure the second transparent lens element gradually changes curvature as the curvature of the first transparent lens element is updated. In some arrangements, the second transparent lens element may be a bistable lens element that is convex in a first stable state and concave in a second stable state.

The lens module may also include a second fluid-filled chamber in addition to the first fluid-filled chamber. A channel between the first and second fluid-filled chambers may allow fluid to travel between the first and second fluid-filled chambers. A valve in the channel may be opened or closed to allow fluid exchange. The actuators that manipulate the first transparent lens element may be used to control the amount of fluid in each one of the first and second fluid-filled chambers.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

The lens modules in the head-mounted device may include lenses that are adjustable. For example, fluid-filled adjustable lenses may be used to adjust the display content for specific viewers.

Figure 1:
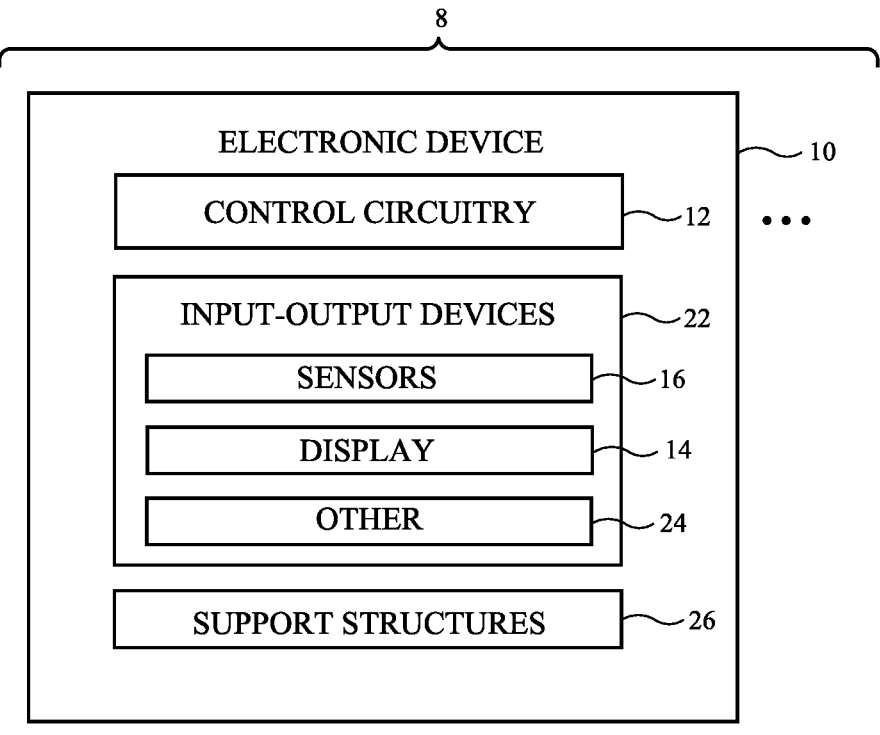
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present display content for a computer-generated reality such as virtual reality content or mixed reality content. Configurations in which display 14 is used to display virtual reality content to a user through lenses are sometimes described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
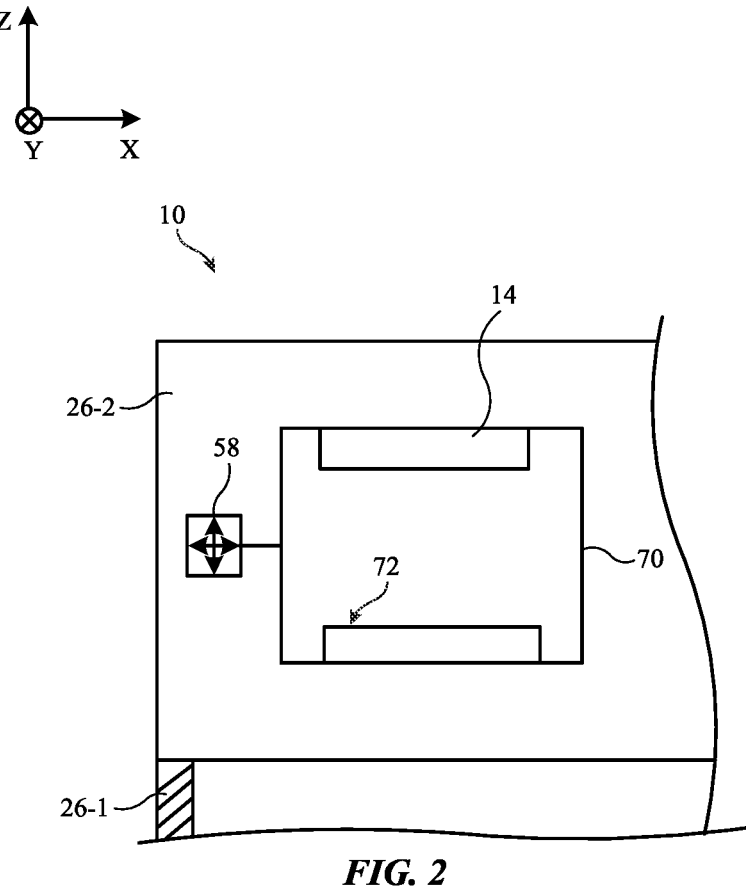
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face.

Display 14 may include left and right display panels (e.g., left and right pixel arrays, sometimes referred to as left and right displays or left and right display portions) that are mounted respectively in left and right display modules 70 corresponding respectively to a user's left eye and right eye. A display module corresponding the user's left eye is shown in FIG. 2.

Each display module 70 includes a display portion 14 and a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes.

In some cases, the distance between lens module 72 and display 14 is variable. For example, the distance between the lens module and the display any be adjusted to account for the eyesight of a particular user. In another example, the lens module may include an adjustable lens element. The curvature of the adjustable lens element may be adjusted in real time to compensate for a user's eyesight, as one example.

Figure 3A:
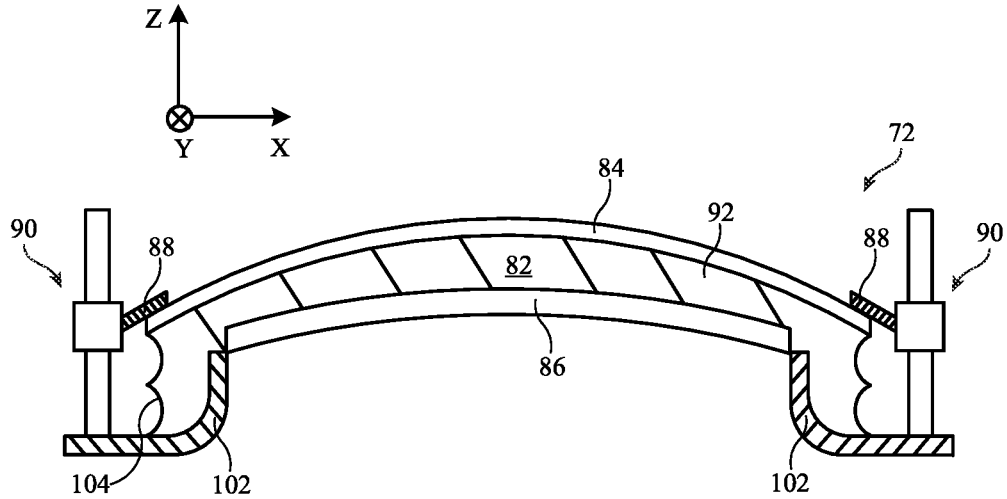
FIGS. 3A and 3B are cross-sectional side views of an illustrative lens module including an elastomeric lens element and a rigid lens element in accordance with an embodiment.
Figure 3B:
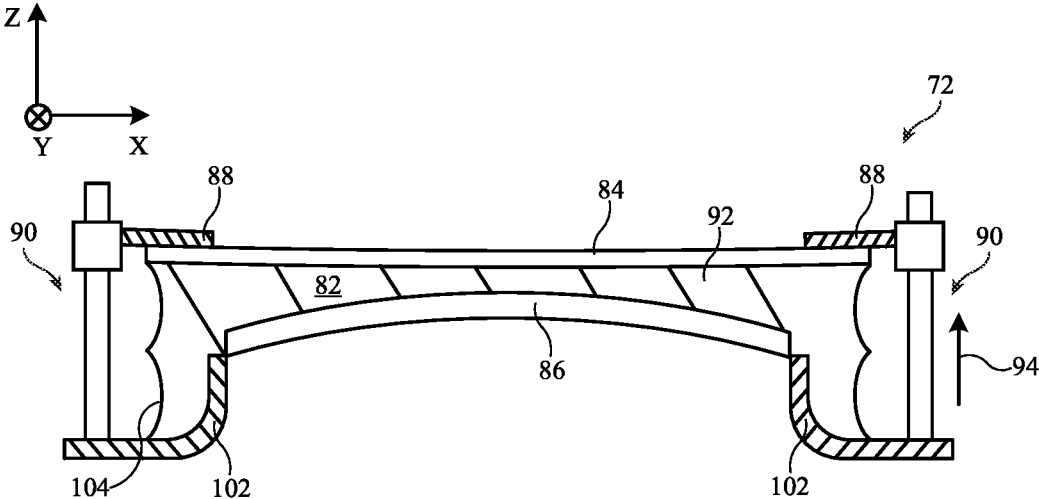

In some cases, an adjustable lens module may include a fluid-filled chamber. FIGS. 3A and 3B are cross-sectional side views of an adjustable lens module 72 with a fluid-filled chamber. As shown, fluid-filled chamber 82 (sometimes referred to as chamber 82 or fluid chamber 82) that includes fluid 92 is interposed between lens elements 84 and 86.

Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may be circular, may be elliptical, or may have any another desired shape.

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example, elastomeric lens element 84 (sometimes referred to as an elastomeric membrane) may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis. A semi-rigid lens element may be more rigid than an elastomeric lens element but less rigid than a rigid lens element.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically or cylindrically concave), or convex (e.g., spherically or cylindrically convex). Rigid lens elements may be formed from a material having a Young's modulus that is greater than 25 GPa, greater than 30 GPa, greater than 40 GPa, greater than 50 GPa, etc.

In FIGS. 3A and 3B (and subsequent figures), a viewer may be configured to view the lens module in the positive Z-direction. In other words, lens element 86 is interposed between the viewer and lens element 84 when a viewer operates device 10. Said another way, lens element 84 is interposed between lens element 86 and display 14 when a viewer operates device 10.

In addition to lens elements 84 and 86 and fluid-filled chamber 82, lens module 72 also includes a lens shaping element 88. Lens shaping element 88 may be coupled to one or more actuators 90. As examples, a plurality of actuators may be positioned around the circumference of the lens shaping element or a single actuator may control deflection of the lens shaping element at multiple points around the circumference of the lens shaping element. The lens shaping element 88 may also be coupled to lens element 84. Actuators 90 may be moved to position lens shaping element 88 (sometimes referred to as lens shaper 88, deformable lens shaper 88, lens shaping structure 88, lens shaping member 88, annular member 88, ring-shaped structure 88, etc.). The lens shaping element 88 in turn manipulates the positioning/ shape of lens element 84. In this way, the curvature of the lens element 84 (and accordingly, the lens power of lens module 72) may be adjusted. An example of actuators 90 and lens shaper 88 being used to change the curvature of lens element 84 is shown in FIG. 3B. As shown, lens shaper 88 is moved in direction 94 by actuators 90. This results in lens element 84 having different curvature in FIG. 3B (with concave curvature) than in FIG. 3A (with convex curvature).

Figure 4:
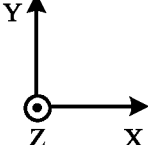
FIG. 4 is a top view of an illustrative lens shaping element that includes extensions for coupling to respective actuators in accordance with an embodiment.
Figure 4:
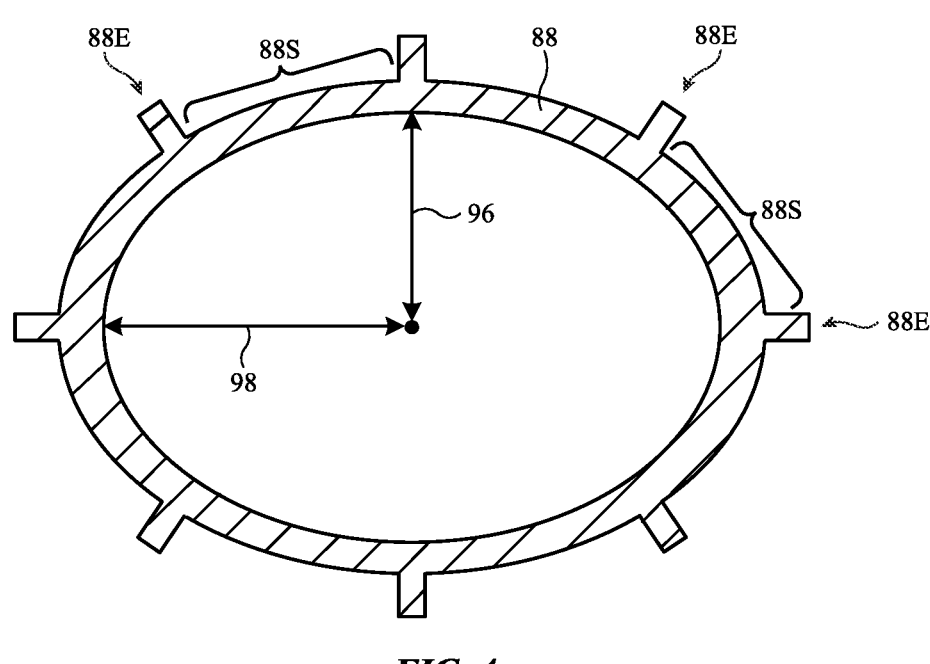

FIG. 4 is a top view of an illustrative lens shaping element 88. As shown, lens shaping element 88 may have an annular or ring shape with the lens shaping element surrounding a central opening. The lens shaping element may have any desired shape. For example, the lens shaping element may be circular, elliptical, or have an irregular shape. In the example of FIG. 4, the lens shaping element has an irregular shape (e.g., a non-uniform radius around the ring shape). For example, a first distance 96 (e.g., a minimum distance) from the center of the central opening to the edge of the lens shaping element may be smaller than a second distance 98 (e.g., a maximum distance) from the center of the central opening to the edge of the lens shaping element. Distance 96 and 98 may be less than 100 millimeters, less than 60 millimeters, less than 40 millimeters, less than 30 millimeters, greater than 10 millimeters, greater than 20 millimeters, between 10 and 50 millimeters, etc.

Lens shaping element 88 has a plurality of tabs 88E that extend from the main portion of the lens shaping element. The tabs 88E (sometimes referred to as extensions 88E, actuator points 88E, etc.) may each be coupled to a respective actuator (or to respective deflection-controlling portions of a single actuator). In one example, each actuator tab may protrude into a slot in the actuator (e.g., a tongue-and-groove arrangement). The slot may selectively be moved up and down (e.g., in the Z-direction) to control the position of tab 88E in the Z-direction. In other words, actuator 90 is a linear actuator. These examples are merely illustrative. In general, any desired type of actuator may be used (e.g., a tongue-and-groove actuator, an actuator with a hinge style paddle, etc.).

In FIG. 4, it is shown how a plurality of tabs 88E (and corresponding actuators) may be distributed around the perimeter of lens shaping element 88. Tabs 88E may be distributed around lens shaping element 88 in a uniform manner (e.g., with equal spacing between each pair of adjacent tabs 88E) or in a non-uniform manner (e.g., with unequal spacing between at least two of the adjacent tabs 88E).

Between each pair of adjacent tabs 88E, there is a lens shaper segment 88S. In the example of FIG. 4, there are 8 tabs 88E around the perimeter of lens shaping element 88. This example is merely illustrative. In general, more tabs (and corresponding actuators) allow for greater control of the shape of the lens element (e.g., lens element 84) to which lens shaping element 88 is coupled. Any desired number of tabs and actuators (e.g., one, two, three, four, more than four, more than six, more than eight, more than ten, more than twelve, more than twenty, less than twenty, less than ten, between four and twelve, etc.) may be used depending upon the specific target shapes for the lens element, the target cost/complexity of the lens module, etc.

In general, each actuator may act as a point force that applies force only in one direction (e.g., parallel to the Z-axis). To prevent unintentionally applying torque or other force to the lens shaping element 88, the actuator slots may be larger than extensions 88E. This provides room for tab 88E to rotate within the slot (preventing torque from being applied to the lens shaper). Additionally, the extension 88E may slide in and out of the slot to prevent unintentionally stretching the lens shaping element.

Lens shaping element 88 may be elastomeric (e.g., a natural or synthetic polymer that has a low Young's modulus for high flexibility, as discussed above in greater detail) or semi-rigid (e.g., formed from a semi-rigid material that is stiff and solid, but not inflexible, as discussed above in greater detail). A semi-rigid lens shaping element may, for example, be formed from a thin layer of polymer, glass, metal, etc. Because lens shaping element 88 is formed in a ring around the lens module, lens shaping element 88 does not need to be transparent (and therefore may be formed from an opaque material such as metal).

Returning to FIGS. 3A and 3B, lens element 86 and/or actuators 90 may be attached to support structure 102 (sometimes referred to as lens module support structure 102, lens housing 102, etc.). The support structure 102 may be formed in a ring around the lens module and may be formed from an opaque or transparent material. Support structure 102 may be rigid and therefore may provide mechanical strength to the lens module 72. Chamber 82 may be defined by lens elements 84 and 86, support structure 102, and/or flexible bellows 104. Flexible bellows 104 may expand and contract to accommodate the chamber being manipulated by lens shaper 88 and actuators 90.

In the example of FIGS. 3A and 3B, lens element 84 is an elastomeric lens element and lens element 86 is a rigid lens element (e.g., having a greater rigidity than lens element 84). In FIG. 3A, lens element 84 is manipulated by lens shaping element 88 to have a convex shape. With this type of arrangement, a positive gauge pressure may be applied to rigid lens element 86 (e.g., a force in the negative Z-direction). In FIG. 3B, lens element 84 is manipulated by lens shaping element 88 to have a concave shape. With this type of arrangement, a negative gauge pressure may be applied to rigid lens element 86 (e.g., a force in the positive Z-direction). However, in both FIGS. 3A and 3B, because lens element 86 is a rigid lens element, the shape of lens element 86 remains constant regardless of whether positive or negative gauge pressure is applied. As shown in FIGS. 3A and 3B, the rigid lens element 86 may maintain the same curvature regardless of how actuators 90 position lens shaper 88.

In some cases, it may be desirable for lens element 86 to also have an adjustable shape. Additional actuators may be included in the lens module to directly manipulate the shape of lens element 86 (similar to as with lens element 84). However, to minimize the cost, complexity, and weight of the device, it may be desirable to avoid including dedicated actuators for lens element 86. To provide an adjustable lens element 86 without including additional actuators, lens element 86 may be a semi-rigid lens element. An arrangement of this type is shown in FIGS. 5A and 5B.

Figure 5A:
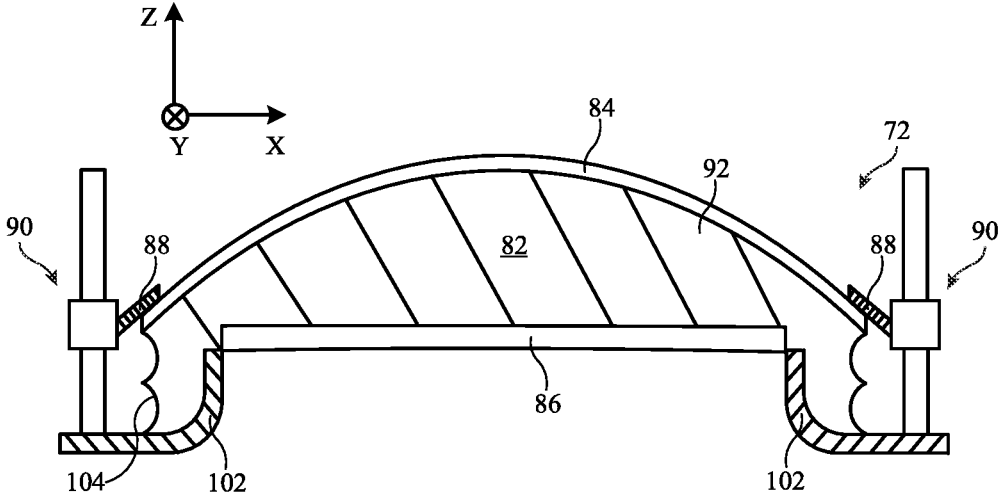
FIGS. 5A and 5B are cross-sectional side views of an illustrative lens module including an elastomeric lens element and a semi-rigid lens element in accordance with an embodiment.
Figure 5B:
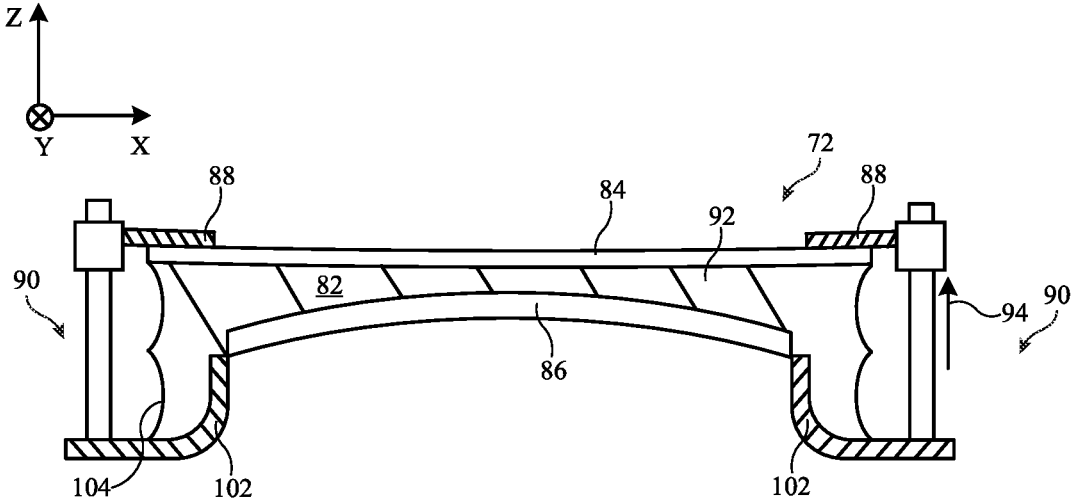

FIGS. 5A and 5B are cross-sectional side views of lens modules having an elastomeric lens element 84 and a semi-rigid lens element 86. The overall structure of the lens module is similar to the structure described in connection with FIGS. 3A and 3B, and descriptions of these duplicate parts will, for clarity, not be repeated. Elastomeric lens element 84 and semi-rigid lens element 86 may be formed from the same material or from different materials.

FIG. 5A shows the lens module in a position where lens element 84 is manipulated by lens shaping element 88 to have a convex shape. With this type of arrangement, a positive gauge pressure may be applied to semi-rigid lens element 86 (e.g., a force in the negative Z-direction). This causes semi-rigid lens element 86 to assume a relatively flat shape with minimal curvature (as shown in FIG. 5A). The radius of curvature of lens element 86 in FIG. 5A (when lens element 84 has convex curvature) may be relatively large. Alternatively, lens element 86 in FIG. 5A may be planar when lens element 84 has convex curvature.

In contrast, FIG. 5B shows the lens module in a position where lens element 84 is manipulated by lens shaping element 88 to have a concave shape. With this type of arrangement, a negative gauge pressure may be applied to semi-rigid lens element 86 (e.g., a force in the positive Z-direction). This causes semi-rigid lens element 86 to have concave curvature with a smaller radius of curvature than in FIG. 5A. The radius of curvature of lens element 86 may change sign and/or may change by more than 10%, more than 20%, more than 50%, more than 100%, more than 200%, etc. when comparing the arrangement of FIG. 5B to the arrangement of FIG. 5A.

In general, it may be desirable for semi-rigid lens element 86 to have less concave curvature when lens element 84 has greater convex curvature and for semi-rigid lens element 86 to have more concave curvature when lens element 84 has greater concave curvature. This type of arrangement may help imitate the lens structures of prescription eyewear, as an example. The lens module of FIGS. 5A and 5B achieves this relationship (of less concave curvature of lens element 86 with increasing convex curvature) without needing additional actuators to directly control the shape of lens element 86. In other words, no actuators in the lens module are attached to lens element 86. However, the pressure applied to lens element 86 as a result of lens element 84 being manipulated (by actuators 90) causes lens element 86 to assume a desired curvature. The curvature of lens element 86 may change gradually as the actuators 90 change the curvature of lens element 84 (due to the gauge pressure on the lens element 86 also changing gradually and the shape of the lens element 86 responding to the gauge pressure).

In FIGS. 5A and 5B, elastomeric lens element 84 may have a Young's modulus of less than 1 GPa, less than 0.5 GPa, less than 0.1 GPa, etc. Meanwhile, semi-rigid lens elements 86 may be formed from a semi-rigid material that is stiff and solid, but not inflexible. The semi-rigid lens element 86 may, for example, be formed from a thin layer of polymer or glass. Semi-rigid lens element 86 may be formed from a material having a Young's modulus that is greater than 1 GPa, greater than 2 GPa, greater than 3 GPa, greater than 10 GPa, greater than 25 GPa, etc. The Young's modulus of lens element 86 may therefore be greater than the Young's modulus of lens element 84.

In the aforementioned example (where the semi-rigid lens element 86 has a greater Young's modulus than elastomeric lens element 84), the elastomeric lens element 84 and semi-rigid lens element 86 may be formed from different materials. This example is merely illustrative. In another possible example, the elastomeric lens element 84 and semi-rigid lens element 86 may be formed from the same materials but have different thicknesses. For example, semi-rigid lens element 86 may have a greater thickness than lens element 84. The semi-rigid lens element may have a thickness that is more than 1.5 times the thickness of lens element 84, more than 2 times the thickness of lens element 84, more than 3 times the thickness of lens element 84, more than 5 times the thickness of lens element 84, more than 10 times the thickness of lens element 84, more than 50 times the thickness of lens element 84, between 1.5 and 10 times the thickness of lens element 84, less than 20 times the thickness of lens element 84, etc. In general, lens element 86 may have a greater thickness and/or Young's modulus than lens element 84.

Figure 6A:
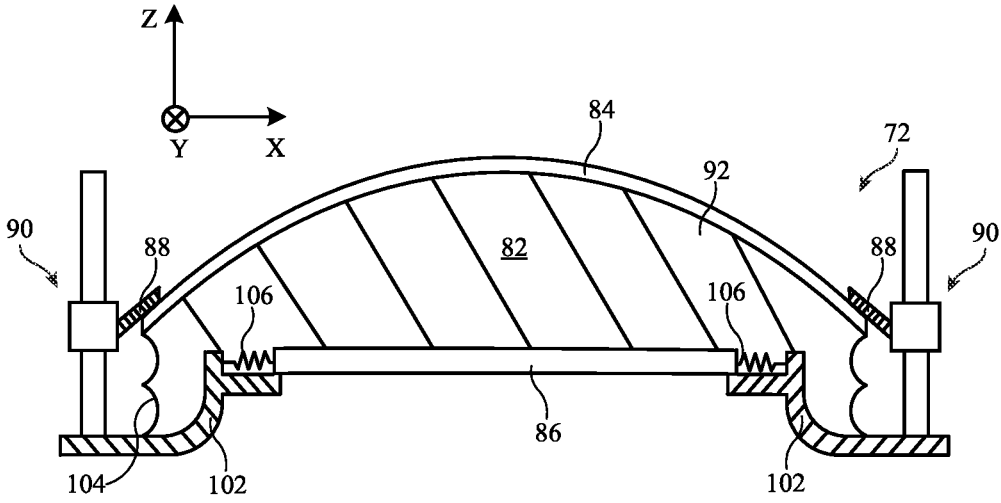
FIGS. 6A and 6B are cross-sectional side views of an illustrative lens module including an elastomeric lens element and a semi-rigid lens element coupled to a biasing structure in accordance with an embodiment.
Figure 6B:
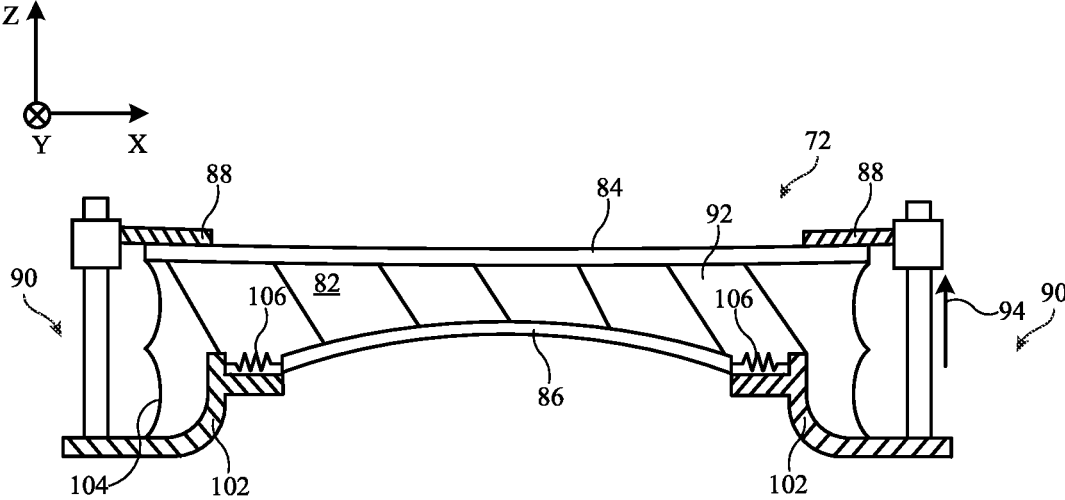

FIGS. 6A and 6B are cross-sectional side views of a lens module having an elastomeric lens element 84 and a dynamically adjustable semi-rigid lens element 86. The overall structure of the lens module is similar to the structure described in connection with FIGS. 5A and 5B, and descriptions of these duplicate parts will, for clarity, not be repeated.

To ensure that lens element 86 gradually changes shape (curvature) as a function of changing gauge pressure, the lens module may also include a biasing structure 106. Biasing structure 106 may extend in a ring around the lens module and may apply a bias force to the lens element 86 (which has a disc-shape). Biasing structure 106 may bias the edges of lens element 86 towards a center of lens element 86. For example, on the left in FIG. 6B, the biasing structure 106 biases the semi-rigid lens element 86 in the positive X-direction (towards the center of the lens element 86). On the right in FIG. 6B, the biasing structure 106 biases the semi-rigid lens element 86 in the negative X-direction (towards the center of the lens element 86). Biasing structure 106 may be formed from a spring, a flexible bellow structure, or any other desired structure that applies a bias force to the edges of the lens element 86. Biasing structure 106 may be formed as a continuous ring around lens element 86 or may include a plurality of discrete biasing structures distributed around the periphery of the lens element that each apply a point force to lens element 86 at a given location.

FIG. 6A shows the lens module in a position where lens element 84 is manipulated by lens shaping element 88 (and actuators 90) to have a convex shape. With this type of arrangement, a positive gauge pressure may be applied to semi-rigid lens element 86 (e.g., a force in the negative Z-direction). This causes the edges of semi-rigid lens element 86 to push outwardly against biasing structure 106. The semi-rigid lens element 86 assumes a relatively flat shape with minimal curvature (as shown in FIG. 6A). The radius of curvature of lens element 86 in FIG. 6A (when lens element 84 has convex curvature) may be relatively large. Alternatively, lens element 86 in FIG. 6A may be planar when lens element 84 has convex curvature.

In contrast, FIG. 6B shows the lens module in a position where lens element 84 is manipulated by lens shaping element 88 to have a concave shape. With this type of arrangement, a negative gauge pressure may be applied to semi-rigid lens element 86 (e.g., a force in the positive Z-direction). This causes semi-rigid lens element 86 to have concave curvature with a smaller radius of curvature than in FIG. 6A. Biasing structure 106 helps push the edges of the lens elements towards a center of the lens element to provide lens element 86 with the desired concave curvature. Therefore, biasing structure 106 (sometimes referred to as spring 106, flexible bellow structure 106, flexible seal structure 106, etc.) helps lens element 86 gradually change shape (curvature) as a function of changing gauge pressure. With the assistance of the biasing structure, lens element 86 gradually changes shape from a planar or high radius of curvature shape (as in FIG. 6A) to a concave shape with a lower radius of curvature (as in FIG. 6B) as actuators 90 gradually change the shape of lens element 84 from convex (as in FIG. 6A) to concave (as in FIG. 6B).

The radius of curvature of lens element 86 may change sign and/or may change by more than 10%, more than 20%, more than 50%, more than 100%, more than 200%, etc. when comparing the arrangement of FIG. 6B to the arrangement of FIG. 6A.

Biasing structure 106 may be attached to the edge of lens element 86 with adhesive or secured to the edge of lens element 86 using another desired attachment mechanism (e.g., a mechanical interlock). As another possible example, biasing structure 106 may be formed integrally with the lens element 86 (e.g., may be formed from the same material as the lens element 86 and/or molded in a single step with lens element 86).

Figure 7A:
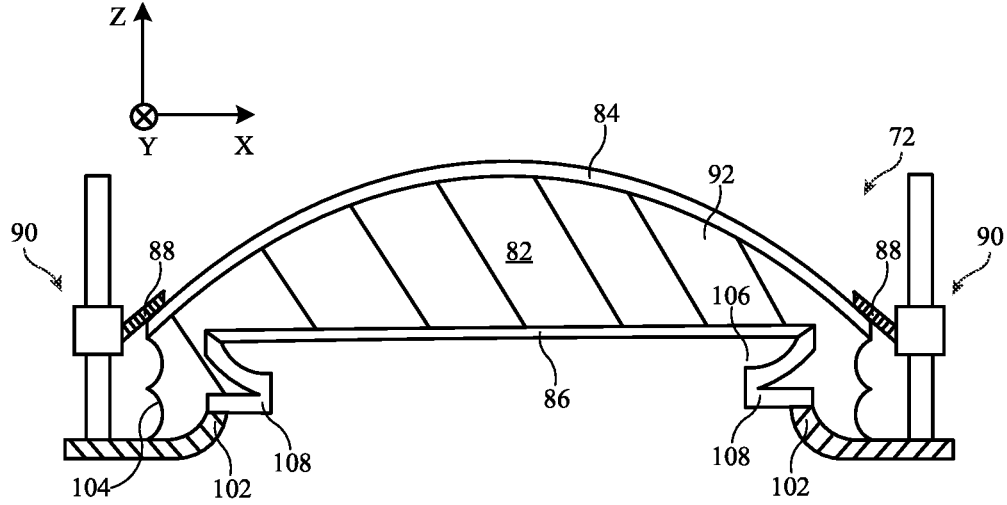
FIGS. 7A and 7B are cross-sectional side views of an illustrative lens module including an elastomeric lens element and a semi-rigid lens element coupled to a flexible seal in accordance with an embodiment.
Figure 7B:
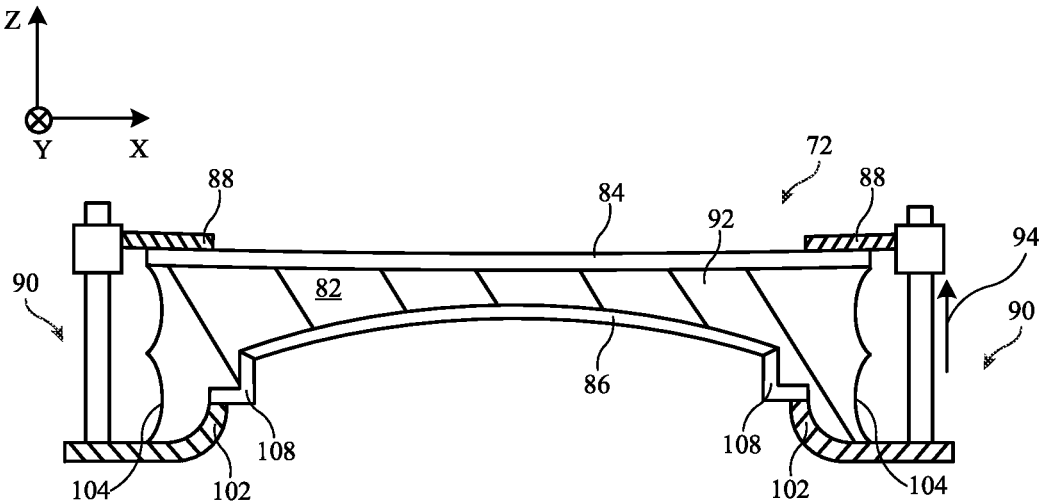

FIGS. 7A and 7B are cross-sectional side views of a lens module having an elastomeric lens element 84 and a dynamically adjustable semi-rigid lens element 86 with a flexible seal. The overall structure of the lens module is similar to the structure described in connection with FIGS. 5A and 5B, and descriptions of these duplicate parts will, for clarity, not be repeated.

To help ensure that lens element 86 gradually changes shape (curvature) as a function of changing gauge pressure, the lens module may also include a flexible seal 108. Flexible seal 108 may extend in a ring around the lens module and may be interposed between lens element 86 and support structure 102. The flexible seal 108 may form a hermetic seal between lens element 86 and support structure 102 to ensure fluid 92 does not leak in or out of the chamber 82 at the seal.

The flexible seal may (similar to biasing structure 106) apply a bias force to the lens element 86 (which has a disc-shape). Flexible seal 108 may bias the edges of lens element 86 towards a center of the lens element. For example, on the left in FIG. 7B, the flexible seal 108 biases the semi-rigid lens element 86 in the positive X-direction (towards the center of the lens element 86). On the right in FIG. 7B, the flexible seal 108 biases the semi-rigid lens element 86 in the negative X-direction (towards the center of the lens element 86).

Flexible seal 108 may be formed from the same material as lens element 86. In this type of arrangement, flexible seal 108 may be thinner than lens element 86. Flexible seal 108 may also be formed from a different material (e.g., a more elastic material having a lower Young's modulus) than lens element 86. Flexible seal 108 (sometimes referred to as biasing structure 108, flexible lip 108, flexible wall 108, etc.) may be formed as a continuous ring around lens element 86.

FIG. 7A shows the lens module in a position where lens element 84 is manipulated by lens shaping element 88 to have a convex shape. With this type of arrangement, a positive gauge pressure may be applied to semi-rigid lens element 86 (e.g., a force in the negative Z-direction). This causes the edges of semi-rigid lens element 86 to push outwardly against flexible seal 108. The flexible seal 108 accommodates the lateral expansion of lens element 86 (e.g., in the X-direction) in this position. The semi-rigid lens element 86 assumes a relatively flat shape with minimal curvature (as shown in FIG. 7A). The radius of curvature of lens element 86 in FIG. 6A (when lens element 84 has convex curvature) may be relatively large. Alternatively, lens element 86 in FIG. 7A may be planar when lens element 84 has convex curvature.

In contrast, FIG. 7B shows the lens module in a position where lens element 84 is manipulated by lens shaping element 88 to have a concave shape. With this type of arrangement, a negative gauge pressure may be applied to semi-rigid lens element 86 (e.g., a force in the positive Z-direction). This causes semi-rigid lens element 86 to have concave curvature with a smaller radius of curvature than in FIG. 7A. Flexible seal 108 helps push the edges of the lens elements towards a center of the lens element to provide lens element 86 with the desired concave curvature. Therefore, flexible seal 108 helps lens element 86 gradually change shape (curvature) as a function of changing gauge pressure. With the assistance of the flexible seal, lens element 86 gradually changes shape from a planar or high radius of curvature shape (as in FIG. 7A) to a concave shape with a lower radius of curvature (as in FIG. 7B) as actuators 90 gradually change the shape of lens element 84 from convex (as in FIG. 7A) to concave (as in FIG. 7B).

The radius of curvature of lens element 86 may change sign and/or may change by more than 10%, more than 20%, more than 50%, more than 100%, more than 200%, etc. when comparing the arrangement of FIG. 7B to the arrangement of FIG. 7A.

Flexible seal 108 may be attached to the edge of lens element 86 with adhesive or secured to the edge of lens element 86 using another desired attachment mechanism (e.g., a mechanical interlock). As another possible example, flexible seal 108 may be formed integrally with the lens element 86 (e.g., may be formed from the same material as the lens element 86 and/or molded in a single step with lens element 86).

Figure 8:
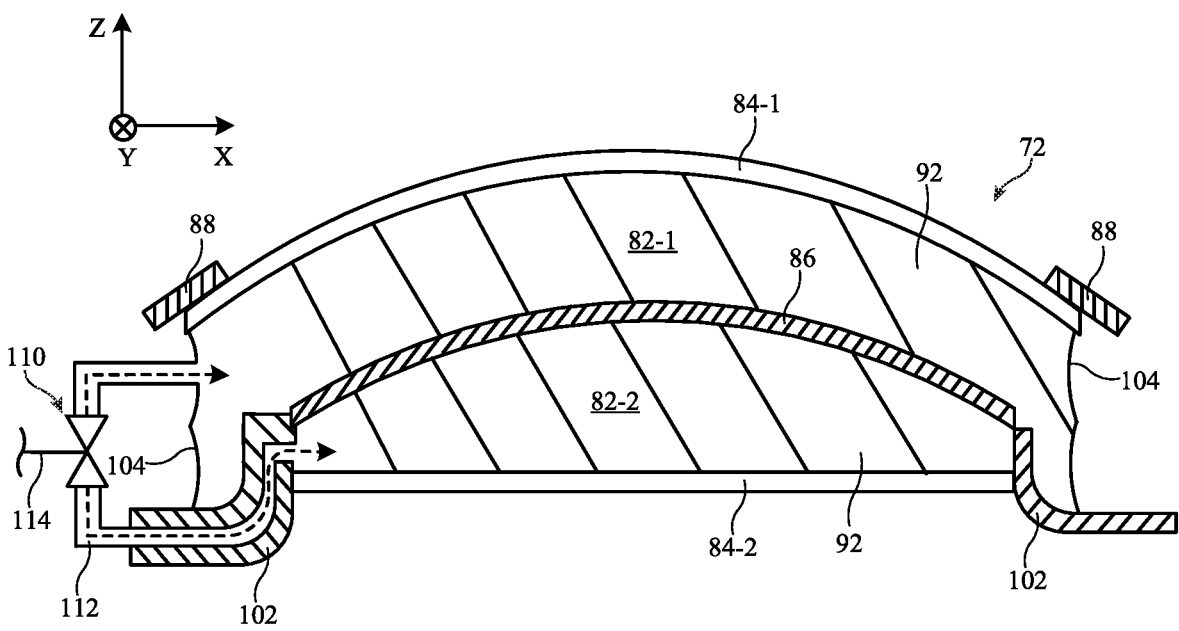
FIG. 8 is a cross-sectional side view of an illustrative lens module including first and second fluid-filled chambers and a valve to control flow between the first and second fluid-filled chambers in accordance with an embodiment.

FIG. 8 is a cross-sectional side view of a lens module having first and second elastomeric lens elements and first and second chambers. Lens module 72 in FIG. 8 includes a first fluid-filled chamber 82-1 and a second fluid-filled chamber 82-2. The first and second fluid-filled chambers 82-1 and 82-2 both are filled with fluid 92 (as described previously). Fluid-filled chamber 82-1 (sometimes referred to as chamber 82-1 or fluid chamber 82-1) is interposed between (and partially defined by) lens elements 84-1 and 86. Fluid-filled chamber 82-2 (sometimes referred to as chamber 82-2 or fluid chamber 82-2) is interposed between (and partially defined by) lens elements 84-2 and 86.

In FIG. 8, lens elements 84-1 and 84-2 are elastomeric lens elements, whereas lens element 86 is a rigid lens element (having a higher rigidity than lens elements 84-1 and 84-2. Lens element 84-1 may be attached to a lens shaper 88 (as discussed in previous figures) that controls the curvature of lens element 84-1. Lens module 72 in FIG. 8 also includes a support structure 102, flexible bellows 104, and one or more actuators as already shown and discussed above.

To enable control of the shape of elastomeric lens element 84-2 without adding additional actuators, a valve 110 may be interposed in a channel 112 between chambers 82-1 and 82-2. Channel 112 may allow fluid to flow between chambers 82-1 and 82-2 when valve 110 is open. When valve 110 is closed, the volume of fluid in chambers 82-1 and 82-2 may remain fixed.

Control circuitry (e.g., control circuitry 12 in FIG. 1) may control valve 110 using a control signal line 114.

As shown in FIG. 8, channel 112 between chambers 82-1 and 82-2 may include an opening in flexible bellow structure 104 (to allow access to chamber 82-1) and/or an opening in support structure 102 (to allow access to chamber 82-2). This example is merely illustrative. In general, channel 112 and valve 110 may be at any desired location that allows fluid exchange between chambers 82-1 and 82-2.

In addition to controlling the curvature of lens element 84-1, lens shaper 88 (and the corresponding actuators) may effectively serve as a pump to control the exchange of fluid between chambers 82-1 and 82-2. Control circuitry in the device may control the actuators to move lens shaper 88 in the negative Z-direction while opening the valve 110. In this state, lens element 84-1 is provided with convex curvature and a positive gauge pressure (e.g., a force in the negative Z-direction) is applied to rigid lens element 86. This positive gauge pressure does not deform the rigid lens element 86 (which maintains its curvature). However, the pressure from the lens shaper/actuators forces fluid 92 out of chamber 82-1 into chamber 82-2 (through channel 112). The increased volume in chamber 82-2 pushes elastomeric lens element 84-2 in the negative Z-direction to reduce the curvature of lens element 84-2. The control circuitry may close valve 110 once the desired lens shape is achieved.

Control circuitry in the device may control the actuators to move lens shaper 88 in the positive Z-direction while opening the valve 110. In this state, lens element 84-1 is provided with concave curvature (as in FIG. 7B, for example) and a negative gauge pressure is applied to rigid lens element 86. This negative gauge pressure does not deform the rigid lens element 86 (which maintains its curvature). However, the negative pressure from the lens shaper/actuators draws fluid 92 out of chamber 82-2 into chamber 82-1. The decreased volume in chamber 82-2 allows elastomeric lens element 84-2 to move in the positive Z-direction to increase the curvature of lens element 84-2. The control circuitry may close valve 110 once the desired lens shape is achieved. In this way, the lens shaper/actuators and valve 110 may be used to control both the curvature of lens elements 84-1 and 84-2.

The radius of curvature of lens element 84-2 may change sign and/or may change by more than 10%, more than 20%, more than 50%, more than 100%, more than 200%, etc. in response to control of lens shaper 88 in FIG. 8.

Figure 9A:
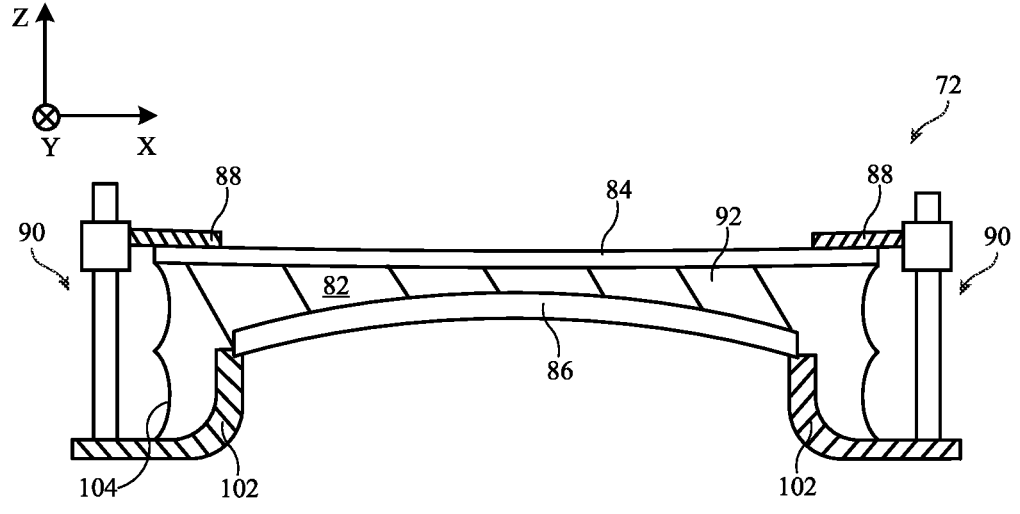
FIGS. 9A and 9B are cross-sectional side views of an illustrative lens module including an elastomeric lens element and a bistable semi-rigid lens element in accordance with an embodiment.
Figure 9B:
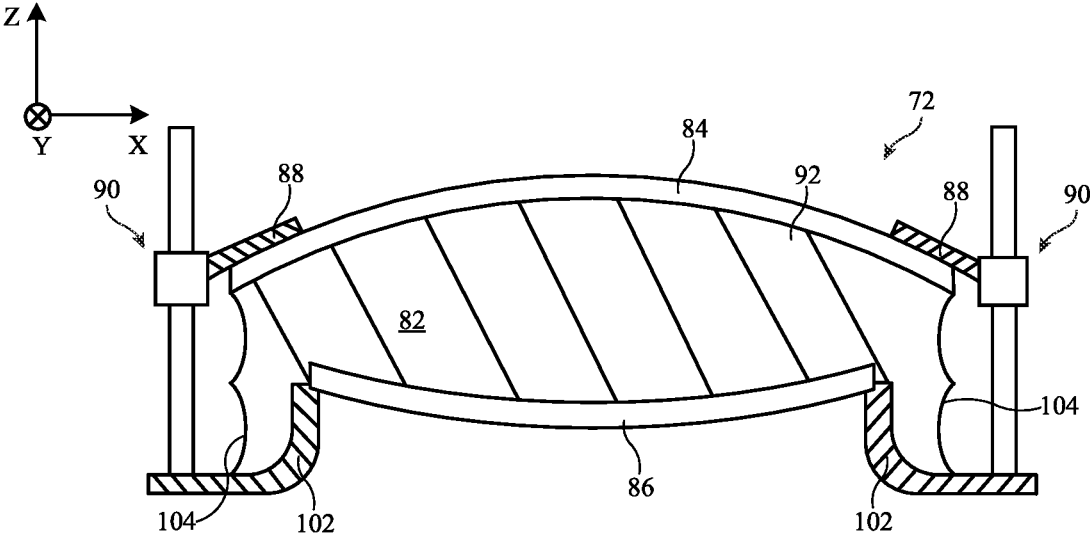

FIGS. 9A and 9B are cross-sectional side views of a lens module having an elastomeric lens element 84 and a bistable semi-rigid lens element 86. The overall structure of the lens module is similar to the structure described in connection with FIGS. 5A and 5B, and descriptions of these duplicate parts will, for clarity, not be repeated. Elastomeric lens element 84 and semi-rigid lens element 86 may be formed from the same material or from different materials.

FIG. 9A shows the lens module in a position where lens element 84 is manipulated by lens shaping element 88 to have a concave shape. With this type of arrangement, a negative gauge pressure may be applied to semi-rigid lens element 86 (e.g., a force in the positive Z-direction). This causes semi-rigid lens element 86 to have concave curvature with a relatively small radius of curvature.

In FIGS. 9A and 9B, the semi-rigid lens element 86 may be pre-stressed when incorporated into lens module 72. In other words, in order to fit into the lens module, the semi-rigid lens element 86 may be squeezed laterally (e.g., with pressure applied to the edges of the lens element towards the center of the lens element). Support structure 102 may apply this pre-stress, as an example. Because of the pre-stress applied to the semi-rigid lens element, the semi-rigid lens element may have two stable states. The semi-rigid lens element may therefore sometimes be referred to as a bistable semi-rigid lens element. Instead of gradually changing from a first curvature to a second curvature (as in FIGS. 5A and 5B, for example), the curvature of lens element 86 may remain as pictured in FIG. 9A as lens shaper 88 moves in the negative Z-direction. In other words, the curvature of lens element 86 remains fixed in a first stable state (as in FIG. 9A) with changing gauge pressure until a gauge pressure is reached that causes the lens element to flip into its second stable state (as pictured in FIG. 9B).

In the second stable state, lens element 84 is manipulated by lens shaping element 88 to have a convex shape. With this type of arrangement, a positive gauge pressure may be applied to semi-rigid lens element 86 (e.g., a force in the negative Z-direction). This causes semi-rigid lens element 86 to have convex curvature.

Pre-stressing lens element 86 therefore causes lens element 86 to have convex curvature when lens element 84 also has convex curvature and concave curvature when lens element 84 also has concave curvature. This example is merely illustrative. In general, any desired relationship between the curvatures of lenses 84 and 86 may be used. However, the curvature of lens element 86 may have two different, stable states (due to the pre-stress applied to its edges) in this arrangement.

In another possible arrangement, lens element may have more than two stable states and may switch between the three or more stable states depending upon the applied gauge pressure. However, the curvature does not change between the three or more stable states.

The radius of curvature of lens element 86 may change sign and/or may change by more than 10%, more than 20%, more than 50%, more than 100%, more than 200%, etc. when comparing the arrangement of FIG. 9B to the arrangement of FIG. 9A.

Figure 10:
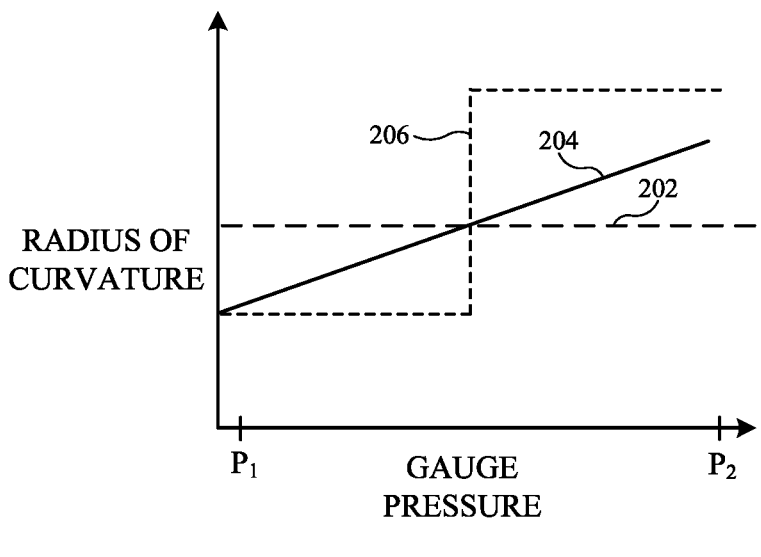
FIG. 10 is a graph of illustrative profiles for the radius of curvature of a lens element as a function of gauge pressure on that lens element in accordance with an embodiment.

FIG. 10 is a graph of various radius of curvature profiles for a lens element as a function of gauge pressure on that lens element. It should be noted that gauge pressure is indicative of the curvature of the elastomeric lens element 84 in the lens module. For example, consider FIGS. 5A and 5B. When lens element 84 is controlled to have concave curvature, the associated gauge pressure on lens element 86 is low (e.g., a negative gauge pressure $P_1$). When lens element 84 is controlled to have convex curvature, the associated gauge pressure on lens element 86 is high (e.g., a positive gauge pressure $P_2$).

Profile 202 shows the radius of curvature of rigid lens element 86 in FIGS. 3A and 3B. As shown, because the lens element is rigid, the radius of curvature of the lens element remains constant from negative gauge pressure $P_1$ to positive gauge pressure $P_2$.

Profile 204 shows an illustrative profile for the radius of curvature of semi-rigid lens element 86 in FIGS. 5-7 (or lens element 84-2 in FIG. 8). As shown, the radius of curvature of the lens element gradually increases (e.g., becomes less curved) when moving from negative gauge pressure $P_1$ to positive gauge pressure $P_2$. In this way, control circuitry in the device may control lens shaper 88 to manipulate the curvature of lens element 84, which causes changes in the gauge pressure on lens element 86, which causes changes in the curvature of lens element 86 according to the profile 204 as shown. The curvature of lens element 86 is therefore dynamically updated in parallel with updating the curvature of lens element 84. Control circuitry in the device may control the lens elements to have curvatures at $P_1$ and $P_2$ in FIG. 10 or any intermediate gauge pressure/curvature.

Profile 206 shows an illustrative profile for the radius of curvature of bistable semi-rigid lens element 86 in FIGS. 9A and 9B. As shown, the radius of curvature of the lens element remains constant in a first stable state when moving from negative gauge pressure $P_1$ to positive gauge pressure P 2. At some intermediate pressure, the lens element 86 may switch from the first stable state to the second stable state. The curvature of the lens element will accordingly make a step change to a different curvature (e.g., the convex curvature of FIG. 9B). The radius of curvature of the lens element then continues to remain constant in the second stable state as the gauge pressure finishes moving to positive gauge pressure $P_2$.

The shape of profiles 204 and 206 are merely illustrative. In general, any desired profile shapes may be used (e.g., profile 204 may be non-linear).

In accordance with an embodiment, a system is provided that includes a head-mounted support structure; a display that emits light; and a lens module supported by the head-mounted support structure that receives the light from the display, the lens module includes first and second transparent lens elements that define a chamber, the first transparent lens element is an elastomeric lens element and the second transparent lens element is a semi-rigid lens element; fluid in the chamber between the first and second transparent lens elements; and a plurality of actuators that are configured to adjust a first curvature of the first transparent lens element, adjusting the first curvature of the first transparent lens element also causes a change in a second curvature of the second transparent lens element.

In accordance with another embodiment, the change in the second curvature of the second transparent lens element includes a change in a radius of curvature of the second transparent lens element of more than 20%.

In accordance with another embodiment, the first transparent lens element is thinner than the second transparent lens element.

In accordance with another embodiment, the first transparent lens element has a lower Young's modulus than the second transparent lens element.

In accordance with another embodiment, the lens module includes a lens shaping structure that is attached between the plurality of actuators and the first transparent lens element.

In accordance with another embodiment, the lens shaping structure has a plurality of extensions.

In accordance with another embodiment, each extension of the plurality of extensions is coupled to a respective actuator of the plurality of actuators.

In accordance with another embodiment, the lens shaping structure extends in a ring around a central opening and the first transparent lens element overlaps the central opening.

In accordance with another embodiment, the second transparent lens element is a bistable lens element with first and second stable states, the second curvature is concave in the first state, and the second curvature is convex in the second state.

In accordance with another embodiment, adjusting the first curvature from being concave to being convex causes the second transparent lens element to switch from the first stable state to the second stable state.

In accordance with another embodiment, gradually adjusting the first curvature from being concave to being convex causes a radius of curvature of the second curvature to gradually increase.

In accordance with another embodiment, the lens module includes a biasing structure that applies a force to an edge of the second transparent lens element towards a center of the second transparent lens element.

In accordance with another embodiment, the lens module includes a support structure, the biasing structure forms a seal between second transparent lens element and the support structure.

In accordance with another embodiment, the plurality of actuators is formed on the support structure.

In accordance with an embodiment, a system is provided that includes a head-mounted support structure; a display that emits light; and a lens module supported by the head-mounted support structure that receives the light from the display, the lens module includes first and second transparent lens elements that define a chamber, the first transparent lens element is an elastomeric lens element and the second transparent lens element is a semi-rigid lens element; fluid in the chamber between the first and second transparent lens elements; and actuators attached to the first transparent lens element that are configured to dynamically adjust curvature of both the first and second transparent lens elements, no actuators are attached to the second transparent lens element.

In accordance with another embodiment, the second transparent lens element has a higher rigidity than the first transparent lens element.

In accordance with another embodiment, the lens module includes a lens shaping structure that is attached between the actuators and the first transparent lens element.

In accordance with another embodiment, the first transparent lens element is thinner than the second transparent lens element.

In accordance with another embodiment, dynamically adjusting curvature of both the first and second transparent lens elements includes adjusting a radius of curvature of the second transparent lens element by more than 20%.

In accordance with an embodiment, a system is provided that includes a head-mounted support structure; a display that emits light; and a lens module supported by the head-mounted support structure that receives the light from the display, the lens module includes a rigid lens element; a first transparent lens element having a lower rigidity than the rigid lens element, the first transparent lens element and the rigid lens element define a first fluid-filled chamber; a second transparent lens element having a lower rigidity than the rigid lens element, the second transparent lens element and the rigid lens element define a second fluid-filled chamber and the first transparent lens element is an elastomeric lens element and the second transparent lens element is a semi-rigid lens element; a channel between the first fluid-filled chamber and the second fluid-filled chamber; a valve in the channel configured to open to allow flow through the channel between the first fluid-filled chamber and the second fluid-filled chamber; and a plurality of actuators that are configured to move the first transparent lens element and to control flow between the first fluid-filled chamber and the second fluid-filled chamber while the valve is open.

In accordance with another embodiment, the lens module includes a ring-shaped structure that is coupled to the first transparent lens element, the plurality of actuators is configured to adjust the ring-shaped structure to move the first transparent lens element.

The foregoing is merely illustrative and various modifications can be made to the described embodiments. The foregoing embodiments may be implemented individually or in any combination.

What is claimed is:

1. A system, comprising:
   a head-mounted support structure;
   a display that emits light; and a lens module supported by the head-mounted support structure that receives the light from the display, wherein the lens module comprises:

first and second transparent lens elements that define a chamber, wherein the first transparent lens element is an elastomeric lens element and the second transparent lens element is a semi-rigid lens element, wherein the first transparent lens element is thinner than the second transparent lens element, and wherein the first transparent lens element has a lower Young's modulus than the second transparent lens element;

fluid in the chamber between the first and second transparent lens elements; and a plurality of actuators that are configured to adjust a first curvature of the first transparent lens element, wherein adjusting the first curvature of the first transparent lens element also causes a change in a second curvature of the second transparent lens element.

2. The system defined in claim 1, wherein the change in the second curvature of the second transparent lens element comprises a change from a first radius of curvature of the second transparent lens element to a second radius of curvature of the second transparent lens element of more than 20%.

3. The system defined in claim 1, wherein the first transparent lens element is formed from a first material having a Young's modulus of less than 1 GPa and wherein the second transparent lens element is formed from a second material having a Young's modulus that is greater than 1 GPa.

4. The system defined in claim 1, wherein the lens module further comprises a lens shaping structure that is attached between the plurality of actuators and the first transparent lens element.

5. The system defined in claim 4, wherein the lens shaping structure has a plurality of extensions and wherein each extension of the plurality of extensions is coupled to a respective actuator of the plurality of actuators.

6. The system defined in claim 1, wherein the fluid in the chamber between the first and second transparent lens elements has a constant volume.

7. The system defined in claim 4, wherein the lens shaping structure extends in a ring around a central opening and wherein the first transparent lens element overlaps the central opening.

8. The system defined in claim 1, wherein the second transparent lens element is a bistable lens element with first and second stable states, wherein the second curvature is concave in the first stable state, and wherein the second curvature is convex in the second stable state.

9. The system defined in claim 8, wherein adjusting the first curvature from being concave to being convex causes the second transparent lens element to switch from the first stable state to the second stable state.

10. The system defined in claim 1, wherein gradually adjusting the first curvature from being concave to being convex causes a radius of curvature of the second curvature to gradually increase.

11. The system defined in claim 1, wherein the lens module further comprises:

a biasing structure that applies a force to an edge of the second transparent lens element towards a center of the second transparent lens element.

12. The system defined in claim 11, wherein the lens module further comprises:

a support structure, wherein the biasing structure forms a seal between the second transparent lens element and the support structure.

13. The system defined in claim 12, wherein the plurality of actuators is formed on the support structure.

14. A system, comprising:

a head-mounted support structure;

a display that emits light; and a lens module supported by the head-mounted support structure that receives the light from the display, wherein the lens module comprises:

first and second transparent lens elements that define a chamber, wherein the first transparent lens element is an elastomeric lens element and the second transparent lens element is a semi-rigid lens element, wherein the elastomeric lens element is formed from a first material having a Young's modulus of less than 1 GPa, and wherein the semi-rigid lens element is formed from a second material having a Young's modulus that is greater than 1 GPa;

fluid in the chamber between the first and second transparent lens elements; and actuators attached to the first transparent lens element that are configured to dynamically adjust curvature of both the first and second transparent lens elements, wherein no actuators are attached to the second transparent lens element.

15. The system defined in claim 14, wherein the lens module further comprises a lens shaping structure that is attached between the actuators and the first transparent lens element.

16. The system defined in claim 14, wherein the first transparent lens element is thinner than the second transparent lens element.

17. A system, comprising:

a head-mounted support structure;

a display that emits light; and a lens module supported by the head-mounted support structure that receives the light from the display, wherein the lens module comprises:

a rigid lens element;

a first transparent lens element having a lower rigidity than the rigid lens element, wherein the first transparent lens element and the rigid lens element define a first fluid-filled chamber;

a second transparent lens element having a lower rigidity than the rigid lens element, wherein the second transparent lens element and the rigid lens element define a second fluid-filled chamber and wherein the first transparent lens element is an elastomeric lens element and the second transparent lens element is a semi-rigid lens element;

a channel between the first fluid-filled chamber and the second fluid-filled chamber;

a valve in the channel configured to open to allow flow through the channel between the first fluid-filled chamber and the second fluid-filled chamber; and a plurality of actuators that are configured to move the first transparent lens element and to control flow between the first fluid-filled chamber and the second fluid-filled chamber while the valve is open.

18. The system defined in claim 17, wherein the lens module further comprises:

a ring-shaped structure that is coupled to the first transparent lens element, wherein the plurality of actuators is configured to adjust the ring-shaped structure to move the first transparent lens element.

* * * * *